United States Patent
Kotwal et al.

(10) Patent No.: US 11,293,778 B1
(45) Date of Patent: Apr. 5, 2022

(54) ATTITUDE SENSOR SYSTEM WITH AUTOMATIC ACCELEROMETER BIAS CORRECTION

(71) Applicant: TIAX LLC, Lexington, MA (US)

(72) Inventors: Thomas Kotwal, Burlington, MA (US); Michael Jacob Rutberg, Somerville, MA (US); Matthew Wiggins, San Jose, CA (US); J. Thomas Fowler, Marblehead, MA (US)

(73) Assignee: TIAX LLC, Lexington, MA (US)

( * ) Notice: Subject to any disclaimer, the term of this patent is extended or adjusted under 35 U.S.C. 154(b) by 305 days.

(21) Appl. No.: 15/353,417

(22) Filed: Nov. 16, 2016

Related U.S. Application Data

(60) Provisional application No. 62/255,817, filed on Nov. 16, 2015.

(51) Int. Cl.
 *G01C 9/08* (2006.01)
 *G01C 25/00* (2006.01)
 *G01C 19/56* (2012.01)
 *G01V 7/02* (2006.01)

(52) U.S. Cl.
 CPC .......... *G01C 25/005* (2013.01); *G01C 9/08* (2013.01); *G01C 19/56* (2013.01); *G01V 7/02* (2013.01)

(58) Field of Classification Search
 CPC ................... G01C 25/005; G01C 9/08
 USPC ............................................... 702/104
 See application file for complete search history.

(56) References Cited

U.S. PATENT DOCUMENTS

| | | | |
|---|---|---|---|
| 3,633,003 A | 1/1972 | Talwani | |
| 5,050,087 A * | 9/1991 | Walrath | G05D 1/0808 244/17.11 |
| 5,339,684 A | 8/1994 | Jircitano et al. | |
| 5,645,077 A * | 7/1997 | Foxlin | A61B 5/1114 600/587 |
| 6,691,437 B1 * | 2/2004 | Yost | E02F 3/435 356/141.2 |
| 8,532,899 B1 * | 9/2013 | Loomis | G01S 19/47 701/70 |
| 8,566,034 B1 * | 10/2013 | Van Wyck Loomis | G01S 19/49 701/480 |
| 8,768,621 B2 | 7/2014 | Ruizenaar | |
| 8,896,301 B2 * | 11/2014 | Oka | G01R 33/028 324/244 |
| 9,417,091 B2 * | 8/2016 | Troni-Peralta | G01C 17/38 |
| 9,568,321 B2 | 2/2017 | Bharadwaj et al. | |
| 2006/0156810 A1 | 7/2006 | Brett et al. | |
| 2008/0046214 A1 | 2/2008 | Fowler | |

(Continued)

FOREIGN PATENT DOCUMENTS

KR 10-0206170 * 7/1999

OTHER PUBLICATIONS

Sparkfun definition of "Accelerometer Basics". (Year: NA).*

(Continued)

*Primary Examiner* — Hien D Khuu
(74) *Attorney, Agent, or Firm* — Dinsmore & Shohl, LLP

(57) ABSTRACT

An attitude sensor system with automatic bias correction having a primary attitude sensor wherein the primary attitude sensor comprises at least one accelerometer and an auxiliary sensor system configured to automatically estimate a bias of the accelerometer of the primary attitude sensor such that the resulting error is removed from an output of the attitude sensor system.

15 Claims, 16 Drawing Sheets

(56) References Cited

U.S. PATENT DOCUMENTS

| | | | | |
|---|---|---|---|---|
| 2009/0309793 A1* | 12/2009 | Loomis | ............. | G01C 21/30 |
| | | | | 342/357.57 |
| 2010/0145620 A1* | 6/2010 | Georgi | ............. | G01P 15/093 |
| | | | | 702/6 |
| 2011/0077891 A1* | 3/2011 | Koenig | ............. | G01P 21/00 |
| | | | | 702/104 |
| 2012/0226395 A1* | 9/2012 | Revol | ............. | G01C 21/16 |
| | | | | 701/4 |
| 2013/0080112 A1* | 3/2013 | Friend | ............. | G01C 9/08 |
| | | | | 702/154 |
| 2013/0304375 A1* | 11/2013 | Lee | ............. | G01C 21/20 |
| | | | | 701/468 |
| 2014/0278191 A1* | 9/2014 | Anderson | ............. | G01P 21/00 |
| | | | | 702/104 |
| 2014/0352400 A1* | 12/2014 | Barrilado | ............. | B81B 7/008 |
| | | | | 73/1.38 |
| 2015/0019266 A1* | 1/2015 | Stempora | ............. | G06Q 40/08 |
| | | | | 705/4 |
| 2015/0276975 A1* | 10/2015 | Carroll | ............. | G01V 7/02 |
| | | | | 73/382 G |
| 2016/0041300 A1 | 2/2016 | Meyer | | |

OTHER PUBLICATIONS

WhatIs.com definition of "rotational acceleration". (Year: 2011) (Year: 2011).*

D Redell, "Thinking About Accelerometers and Gravity", 1998, Livermore Unit Nat. Assoc. (Year: 1998).*

* cited by examiner

ATTITUDE SENSOR SYSTEM WITH AUTOMATIC ACCELEROMETER BIAS CORRECTION

CROSS REFERENCE TO RELATED APPLICATIONS

This application depends from and claims priority to U.S. Patent Application No. 62/255,817 filed Nov. 16, 2015.

STATEMENT OF GOVERNMENT SPONSORSHIP

This invention was made with government support under contract no. N00024-10-C-4110, awarded by the United States Navy. The government has certain rights in the invention.

TECHNICAL FIELD

The present specification generally relates to attitude sensor systems, in particular those based on accelerometers that exhibit bias drift over time.

BACKGROUND

Attitude sensors that measure and output pitch and roll are used for a wide variety of sensing and control applications. A common implementation consists of a minimum of three accelerometers whose sensitive axes are not co-linear, most typically a set of three accelerometers arranged in a nominally orthogonal configuration, known as a triaxial accelerometer. The three accelerometers have a nonzero DC response such that when the sensor is at rest, the projection of the static gravitational acceleration vector onto each of the three accelerometers is measured. From these values, the pitch and roll of the attitude sensor and the magnitude of the gravitational acceleration vector can be determined.

A bias error in one or more of the three accelerometers will manifest as errors in the pitch, roll and gravitational magnitude estimates. Accelerometer bias error is routinely calibrated out under controlled conditions, but many accelerometers, in particular those based on MEMS, exhibit bias drift over time. For certain applications, accelerometer bias that accumulates post-calibration results in unacceptable errors in roll and pitch.

One important example of such an application is magnetic heading measurement at high latitudes. A non-gimbaled magnetic heading sensor incorporating a triaxial magnetometer requires a pitch and roll sensor to calculate the projection of the magnetic vector on the horizontal plane. At high latitudes, the strength of the vertical magnetic field can be more than ten times that of the horizontal magnetic field, so even small errors in pitch and roll introduce large errors in magnetic heading.

Accordingly, a need exists for an alternative accelerometer-based attitude sensor that automatically estimates accelerometer bias on an ongoing basis and applies correction factors to effectively eliminate that bias.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

In a first aspect, an attitude sensor system with automatic bias correction may include a primary attitude sensor wherein the primary attitude sensor comprises at least one accelerometer, and an auxiliary sensor system configured to automatically estimate a bias of the at least one accelerometer of the primary attitude sensor such that an error resulting from that bias is removed from an output of the attitude sensor system.

In another aspect, a method for automatic bias correction in an attitude sensor system may include obtaining an acceleration value from a sensitive axis of an accelerometer of a primary attitude sensor, obtaining an acceleration value of an auxiliary sensor system, determining a difference between the acceleration value of the primary attitude sensor and the acceleration value of the auxiliary sensor system to estimate a bias subtracting the bias from the acceleration value of the primary attitude sensor to generate a bias-corrected primary attitude signal; and outputting a bias-corrected primary attitude sensor signal.

These and additional features provided by the aspects described herein will be more fully understood in view of the following detailed description, in conjunction with the drawings.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings, where like structure is indicated with like reference numerals and in which:

DETAILED DESCRIPTION

Figure 1:
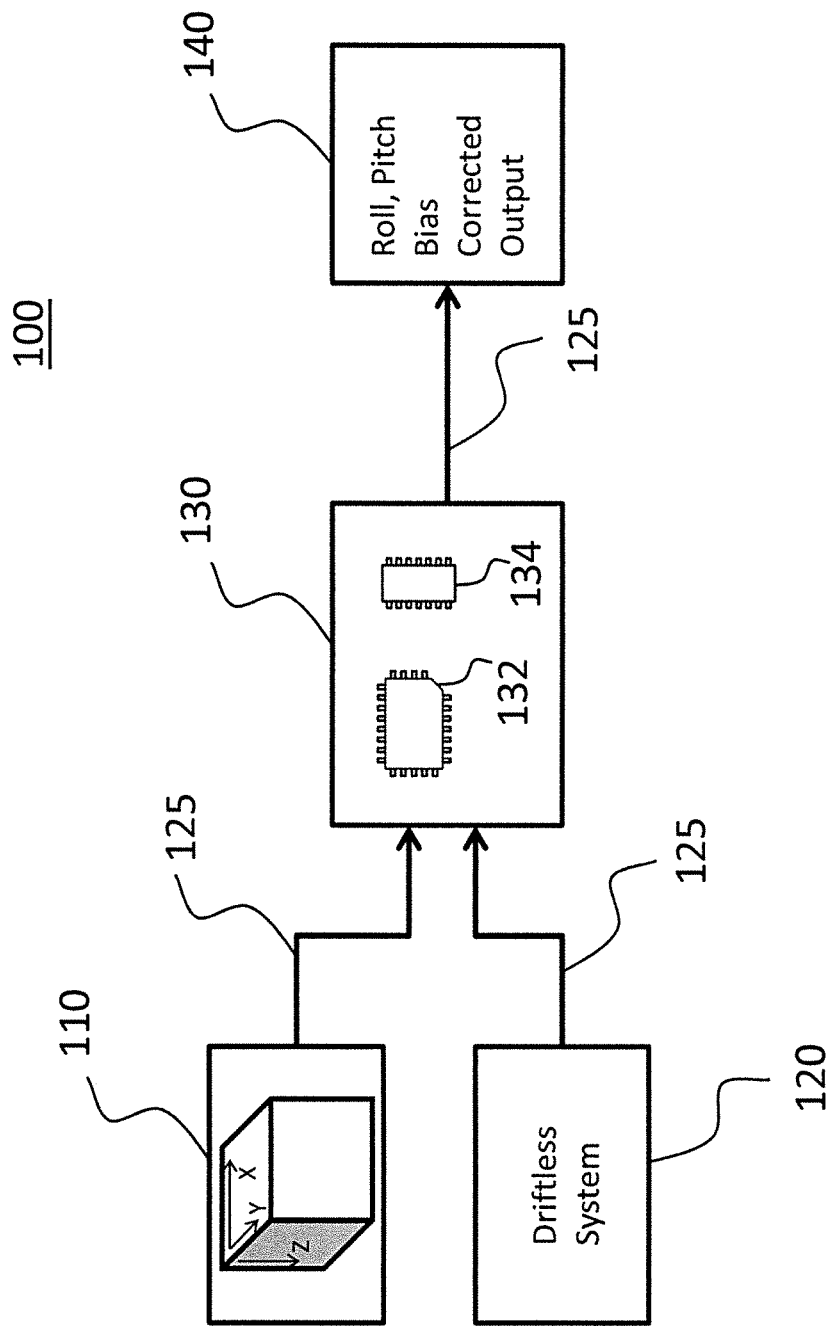
FIG. 1 depicts an example schematic of an attitude sensor system with automatic bias correction according to one or more aspects shown and described herein.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

An accelerometer-based attitude sensor system that automatically estimates accelerometer bias on an ongoing basis and applies correction factors to effectively eliminate that bias is described herein. The accelerometer bias estimates are derived using at least one auxiliary sensor system that exhibits an acceptable level of stability compared to overall system requirements, referred to here as a driftless system. The incorporated driftless systems are limited in that they provide incomplete attitude information over the range of orientations required by the attitude sensor system, and as such are more compact, low-power, robust and/or cost-effective than non-limited driftless systems. Aspects provided herein thus enable a small, comparatively low-cost attitude sensor, such as a MEMS-based attitude sensor, to achieve unprecedented stability. Various aspects of an accelerometer attitude sensor system with automatic bias correction will be described in more details herein.

Referring to FIG. 1, an example schematic of an attitude sensor system 100 with automatic bias correction is depicted. The attitude sensor system 100 with automatic bias correction comprises a primary attitude sensor 110, an auxiliary sensor system 120, a microcontroller 130 including a processor 132 and a non-transitory computer readable memory 134, a communication path 125 and a bias corrected output 140. The primary attitude sensor 110 comprises, for example, but is not limited to, an accelerometer arrangement having at least three sensitive axes nominally orthogonal to each other where a signal indicative of the acceleration along each of the sensitive axes is generated by the primary attitude sensor 110. A sensitive axis refers to the axis along which a sensor is capable of sensing and generating a signal indicative of a vector having a magnitude and direction related to acceleration along that axis. The accelerometers of the primary attitude sensor 110 may comprise any device capable of generating a signal in response to acceleration along a sensitive axis, such as, without limitation, a bulk micromachined capacitive accelerometer, a bulk micromachined piezoelectric resistive accelerometer, a capacitive spring mass system, a micro electro-mechanical system (MEMS), or the like. The primary attitude sensor 110 is communicatively coupled via a communication path 125 to the microcontroller 130.

The auxiliary sensor system 120, also referred to as a driftless system, comprises sensors and/or systems configured to provide signals indicative of tilt and/or acceleration along sensitive axes of the primary attitude sensor to automatically estimate a bias of the primary attitude sensor 110. Examples of the driftless system are described in more detail herein. The driftless system is also communicatively coupled to the microcontroller 130 via the communication path 125.

The microcontroller 130 may comprise analog logic, digital logic or a combination thereof. Analog logic may comprise a combination of operational amplifiers, resistors, capacitor, inductors, diodes, transistors, or the like that is coupled to form a circuit to perform a desired logic function. A digital logic may comprise a combination of transistors to create logic gates in order to perform a desired logic function. Digital logic may also comprise a processor 132 communicatively coupled with a non-transitory computer readable memory 134 having a machine-readable instruction set defined to perform a desired logic function in response to a set of input signals. The microcontroller 130 generates a bias-corrected output 140. The bias-corrected output 140 may be provided to another system as an input.

The processor 132 may be any device capable of executing the machine-readable instruction set stored in the non-transitory computer readable memory 134. Accordingly, the processor 132 may be a controller, an integrated circuit, a microchip, a computer, or any other computing device. The processor 132 is communicatively coupled to the other components of the attitude sensor system 100 by the communication path 125. Accordingly, the communication path 125 may communicatively couple any number of processors with one another, and allow the components coupled to the communication path 125 to operate in a distributed computing environment. Specifically, each of the components may operate as a node that may send and/or receive data. While aspects may include a single processor 132, other aspects may include more than one processor 132.

The non-transitory computer readable memory 134 is coupled to the communication path 125 and communicatively coupled to the processor 132. The non-transitory computer readable memory 134 may comprise RAM, ROM, flash memories, hard drives, or any non-transitory memory device capable of storing machine-readable instructions such that the machine-readable instruction set can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory. Alternatively, the functionality of the machine-readable instruction set may be written in a hardware description language (HDL), and implemented as a logic circuit via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While aspects may include a single non-transitory computer readable memory 134, other aspects may include more than one memory module.

The communication path 125 may be formed from any medium that is capable of transmitting a signal such as, for example, conductive wires, conductive traces, optical waveguides, or the like. The communication path 125 may also refer to the expanse in which electromagnetic radiation and their corresponding electromagnetic waves traverses. Moreover, the communication path 125 may be formed from a combination of mediums capable of transmitting signals. In one aspect, the communication path 125 comprises a combination of conductive traces, conductive wires, connectors, and buses that cooperate to permit the transmission of electrical data signals to components such as processors, memories, sensors, input devices, output devices, and communication devices. Accordingly, the communication path 125 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 125 communicatively couples the various components of attitude sensor system 100. As used herein, the term "communicatively coupled" means that coupled components are capable of exchanging data signals with one another such as, for example, electrical signals via conductive medium, electromagnetic signals via air, optical signals via optical waveguides, and the like.

Aspects described herein utilize driftless systems 120 to estimate bias in a primary sensing accelerometer in the field. Driftless systems 120 are not practical as primary attitude sensors 110 for many attitude-sensing applications. Driftless systems 120 may be categorized in two groups. A first category of driftless systems 120 is not a practical primary attitude sensor 110 due to their cost, size, and/or lack of robustness. For example, ring laser gyroscopes can be considered driftless orientation sensors for most attitude sensing applications; however, they are cost-prohibitive for many of those applications. A second category of driftless systems 120 may be sufficiently low-cost, compact and robust to practically integrate into a given attitude sensor, but are unsuitable as a primary attitude sensor 110 because they provide incomplete attitude information over the range of orientations required by the attitude sensor. Aspects of the attitude sensor system 100 with automatic accelerometer bias correction may use various combinations of a number of driftless systems 120, as described below.

In some aspects, a driftless system 120 comprises a fluid-based tilt sensor such as an electrolytic tilt sensor. Electrolytic tilt sensors are mature, small, low power devices that are inherently free of bias drift. Fluid-based tilt sensors are used in a wide array of applications that demand highly repeatable tilt sensing, including seismic monitoring, avionics, construction, and solar tracking. The sensor is composed of a small container, typically made of glass, ceramic, or plastic, that houses electrically conductive fluid and a small air bubble. A number of electrodes protrude into the container, and as the sensor tilts, the air bubble moves, causing a change in impedance between the electrodes, which can be used to measure the angle of the sensor with high repeatability. Fluid-based tilt sensors may comprise one or more sensitive axes, such that the sensor measures the absolute rotational position about each sensitive axis.

Fluid-based tilt sensors are available in small packages and can easily be integrated with an accelerometer onto a circuit board. Additionally, they are sensitive over limited ranges of roll and pitch. As non-limiting examples, an electrolytic tilt sensor may comprise a single axis tilt sensor, for example, part no. 0737-0604-99 or part no. 0703-0711-99 from The Fredericks Company, Huntington Valley, Pa. or a dual axis tilt sensor, for example, model series no. SP5000 from Spectron Glass and Electronics Incorporated, Hauppauge, N.Y.

In other aspects, a driftless system 120 comprises an accelerometer with reduced range. The drift of a MEMS accelerometer is generally related to the range of the device; i.e. an accelerometer with a range of ±10 g will have larger drift than an accelerometer with a range of ±1 g. An accelerometer whose range is reduced compared to that of the primary attitude sensing accelerometers may therefore be considered driftless for some applications. In some aspects, the reduced range accelerometer will have a range of less than ±1 g. It follows that gravitational acceleration will only be within that reduced range when the attitude sensor is in a limited range of orientations.

In other aspects, a driftless system 120 comprises a gravimeter. A gravimeter is a device that precisely measures a magnitude of the local gravity vector. Alternatively, a gravimeter may be an instrument capable of measuring the difference in gravity at different locations. Some gravimeters determine the magnitude of the local gravity vector by relying on measurements from an accelerometer obtained across multiple orientations. The accelerometer, in such an aspect, may be a primary attitude sensing accelerometer or an auxiliary accelerometer.

Figure 2:
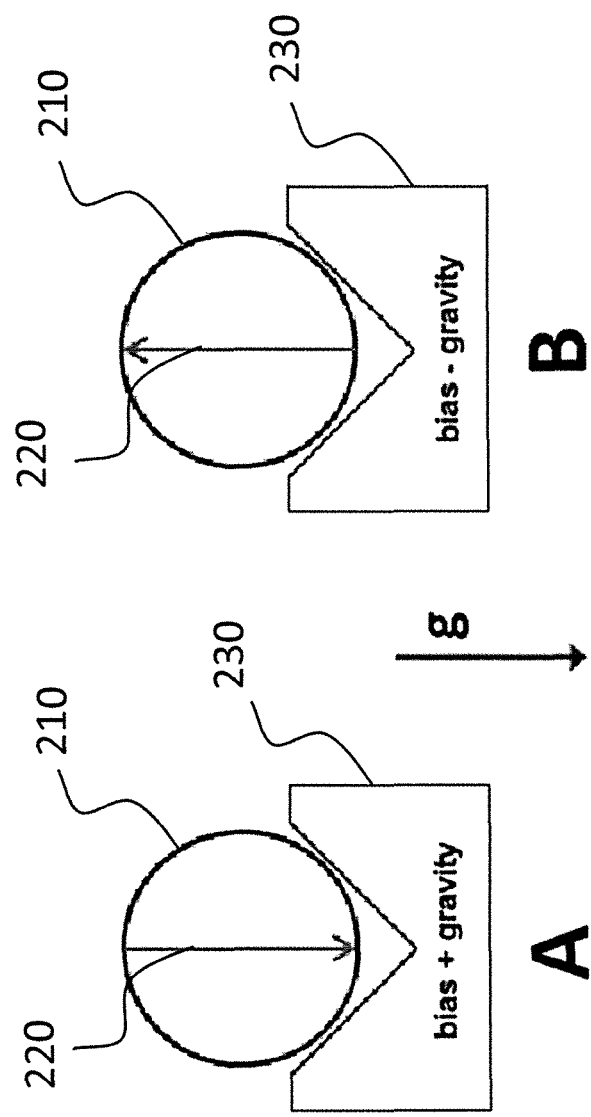
FIG. 2 illustrates the principle of operation of a multiple-orientation gravimeter by considering a single accelerometer mounted in a cylinder according to one or more aspects shown and described herein.

FIG. 2 illustrates the principle of operation of a multiple-orientation gravimeter by considering a single accelerometer mounted in a cylinder 210. The accelerometer has a sensitive axis 220 oriented across the axis of the cylinder 210. In FIG. 2, the cylinder 210 rests in a vee-block 230 such that the sensitive axis 220 of the accelerometer is co-directionally aligned with the gravity vector, denoted by "g". A measurement in this first orientation, denoted by "A", includes the bias associated with the accelerometer plus the true gravitational acceleration. When the cylinder 210 is rotated 180 degrees in the vee-block 230, the sensitive axis of the accelerometer is oppositionally aligned with the gravity vector, "g". A measurement in this second orientation, denoted by B, includes the bias associated with the accelerometer minus the true gravitational acceleration. The average difference of the measurements from these two orientations, A and B, yields an estimate of the magnitude of gravitational vector, i.e., $$\text{gravity} = \frac{(A-B)}{2},$$

while the average sum of the measurements from these two orientations, A and B, yields an estimate of the accelerometer bias, i.e., $$\text{bias} = \frac{(A+B)}{2}.$$

While only two orientations are illustrated in the above aspect, in some aspects, measurements may be obtained from the accelerometer in multiple orientations as the accelerometer rolls through 360 degrees in normal operation.

In operation, a given accelerometer sensitive axis may never be perfectly aligned with vertical, i.e. the direction of gravity. Therefore, some acceptable window around vertical is defined. Within that window, the measurements are corrected for off-vertical angle using the estimates of pitch and roll from the attitude sensor. Additionally, gravity and bias calculations are susceptible to noise associated with the acceleration measurements and kinematic acceleration of the sensitive axis. In some aspects, a digital low-pass infinite impulse response, "IIR" filter may be used to filter the gravity and bias estimates and/or their precursor signals. For example, the IIR filter may filter the acceleration measurements effectively mitigating the effects of kinematic acceleration and accelerometer noise.

In yet other aspects, a driftless system 120 may comprise a virtual gravimeter. The magnitude of earth's gravitational field varies considerably over the surface of the earth but is stable over timescales applicable to most attitude sensing systems. Therefore, a gravimeter would not necessarily need to be physically incorporated into the attitude sensor. Rather, any of a number of virtual gravimeter implementations could be used. As a non-limiting example, an attitude sensor for a non-mobile attitude system could include a calibration coefficient that corresponds to the magnitude of gravity measured at the site of deployment. On the other hand, an attitude sensor for a mobile system could include a gravity map covering the area of operation, and the location within that map would be provided by the mobile system in which the attitude sensor is installed. Alternatively, the magnitude of the gravity vector could be directly communicated to the attitude sensor by the mobile system, which in turn could use either a gravity map or a direct measurement from an on-board gravimeter with sufficient accuracy and precision.

In aspects comprising a virtual gravimeter, gravity measurements or a gravity map may be stored in the non-transitory computer readable memory 134 and accessed by the processor 132 for computing the bias of a non-mobile or mobile attitude sensor system 100. Additionally, the attitude sensor system 100 may be coupled with a global positioning system for determining the location of the attitude sensor system 100 relative to locations on a gravity map. The processor may in turn provide the system with the virtual gravimeter value based on the stored gravity measurements or gravity map.

The aspects of the driftless system 120 described above may be combined in various ways to enable automatic estimation of bias in the accelerometers of the primary attitude sensor. Example aspects are described below, with illustrative details and simulations demonstrating operation. Note that the described aspects are an example subset of possible aspects of the invention. The scope of the invention is not limited to the described aspects. Other variations are possible and obvious to a person with ordinary skill in the art who has read and understood the described aspects.

In each of the following aspects, an attitude sensor system comprising a driftless system 120 for correcting a primary attitude sensor 110 having three sensing accelerometers is described. While three sensing accelerometers whose sensitive axes are nominally orthogonal is described herein, aspects are not limited to three accelerometer arrangements. Aspects may comprise two or more accelerometers where at least three sensitive axes are nominally orthogonal. In other aspects, a single accelerometer comprising three nominally orthogonal sensitive axes may be implemented to achieve the same. Each aspect described below, and as provided herein, can be used to enable correction for drift of the primary attitude sensor 110 over time, and thus improve the performance life and/or accuracy of the attitude sensor system 100.

Figure 3A:
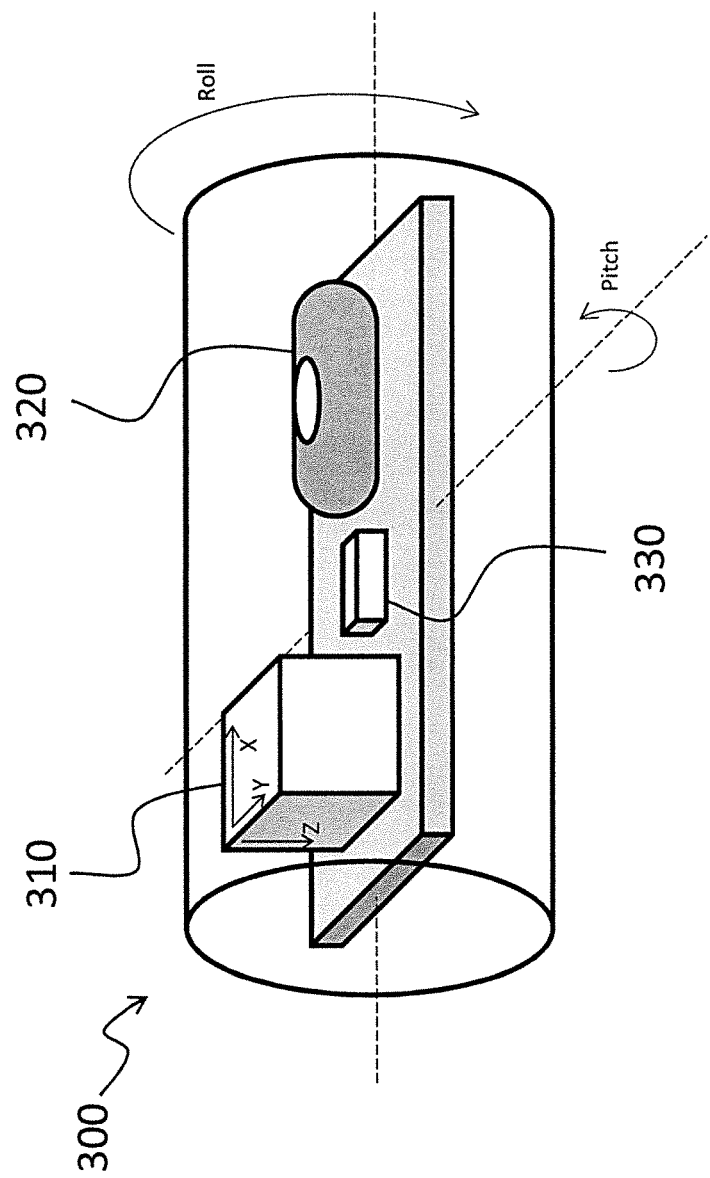
FIG. 3A depicts a schematic of an attitude sensor system having a primary attitude sensor and a driftless system comprising two multiple-orientation gravimeters and a single-axis fluid-based tilt sensor according to one or more aspects shown and described herein.

Referring now to FIG. 3A, a schematic of an attitude sensor system 300 having a primary attitude sensor 310 and a driftless system comprising two multiple-orientation gravimeters and a single-axis fluid-based tilt sensor 320 is depicted. The primary attitude sensor 310 includes an X-axis accelerometer, Y-axis accelerometer, and Z-axis accelerometer. Each of the X-axis accelerometer, Y-axis accelerometer, and Z-axis accelerometer generates a signal indicative of the acceleration along its respective sensitive axis. For example, the X-axis accelerometer generates a signal indicative of the acceleration along the X-axis, its sensitive axis. The sensitive axis of the single-axis fluid-based tilt sensor 320 of the driftless system is nominally orthogonal to the X-axis of the attitude sensor system 300. The single-axis fluid-based tilt sensor 320 is responsive to pitch, i.e. rotation about an axis nominally orthogonal to the X-axis. The single-axis fluid-based tilt sensor 320 generates a signal indicative of the pitch within its defined operational range. For example, the single-axis fluid-based tilt sensor may have an operational range of +/−1°, +/−5°, or +/−10°. The two multiple-orientation gravimeters are based on the Y-axis and Z-axis accelerometers of the primary attitude sensor 310. The primary attitude sensor 310 and the single-axis fluid-based tilt sensor 320 are communicatively coupled to the microcontroller 330. The aspect depicted in FIG. 3A may be installed in a system that rotates fully around a substantially non-vertical axis, such that the X-axis of the attitude sensor is nominally aligned with the axis of rotation of the system in which the attitude sensor is installed (i.e. roll axis).

Figure 3B:
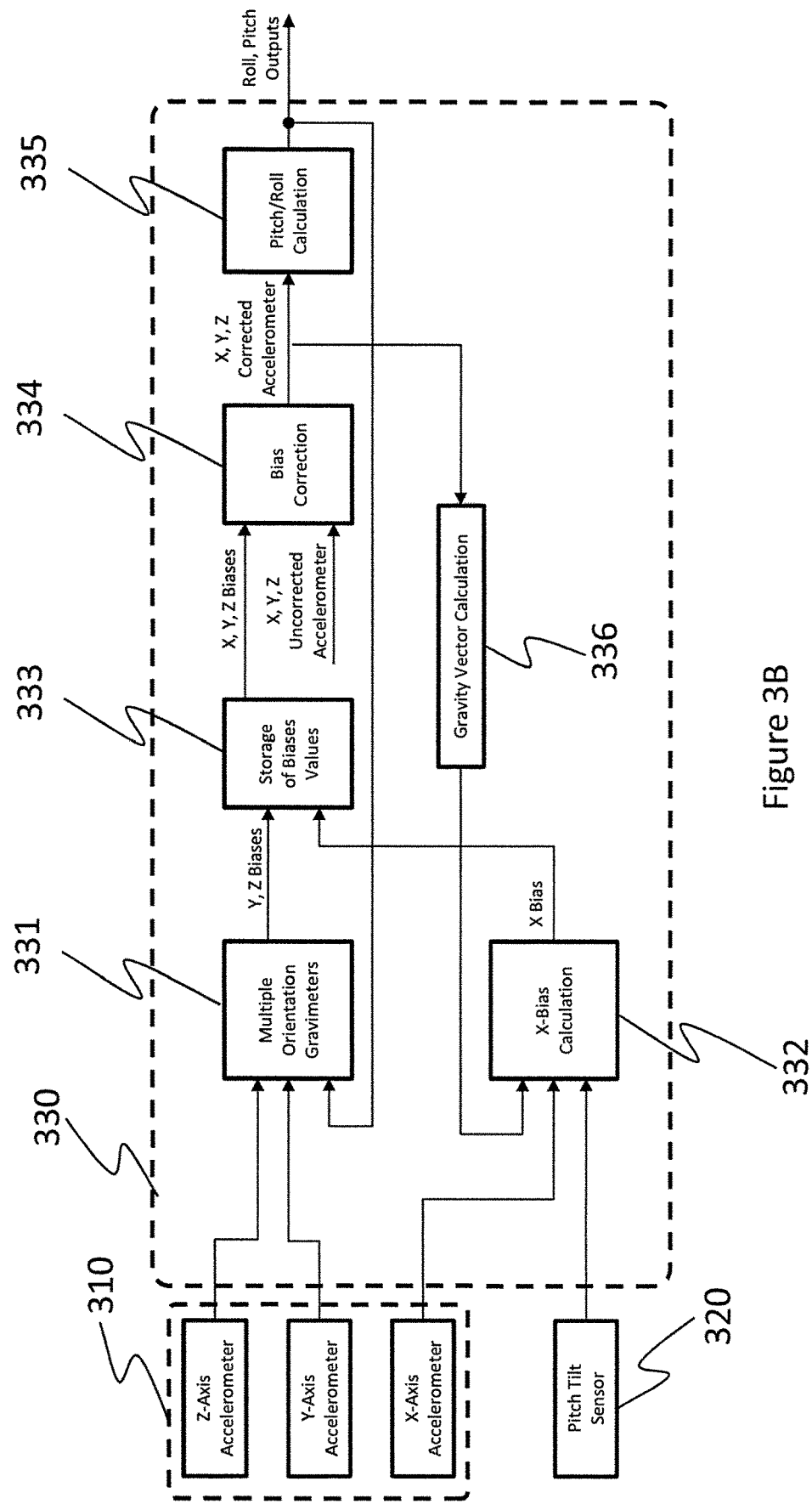
FIG. 3B depicts a block diagram of the operations carried out by the microcontroller of the attitude sensor system illustrated in FIG. 3A according to one or more aspects shown and described herein.

Referring now to FIG. 3B, a block diagram of the operations carried out by the microcontroller 330 of the attitude sensor system 300 illustrated in FIG. 3A is depicted. The microcontroller 330 receives at least an X-axis accelerometer signal, a Y-axis accelerometer signal, a Z-axis accelerometer signal from the primary attitude sensor 310 and a pitch signal from the single-axis fluid-based tilt sensor 320. The bias on Y-axis accelerometer, Z-axis accelerometer and the magnitude of the gravity vector may be estimated as in the above description of the multiple-orientation gravimeter. That is the microcontroller 330 computes the average difference of the measurements from at least two vertically opposing orientations A & B (as shown and described in relation to FIG. 2) to yield an estimate of the magnitude of the gravitational vector. The microcontroller 330 also computes the average sum of the measurements from at least two vertically opposing orientations A & B (as shown and described in relation to FIG. 2) to yield an estimate of the accelerometer bias.

For example, in block 331, the Y-axis accelerometer signal and Z-axis accelerometer signal are communicated to the microcontroller 330. The microcontroller 330 may sample portions of the received Y-axis accelerometer signal and Z-axis accelerometer signal and store the sampled signals as measurements of acceleration along the Y-axis and Z-axis respectively in the non-transitory computer readable memory 134. The microcontroller 330 samples the Y-axis accelerometer signal and Z-axis accelerometer signal when the calculated roll and pitch values indicate the orientation is appropriate for performing the multiple orientation gravimeter calculation, as described in the principal of operation. The microcontroller 330 may then compute the average difference of the measurements of acceleration along the Y-axis and Z-axis, to determine the magnitude of the gravitational vector, respective of each Y-axis and Z-axis accelerometer. The microcontroller 330 may also compute the average sum of the measurements of acceleration along the Y-axis and Z-axis to determine the estimate of the accelerometer bias, respectively Y bias and Z bias. The Y bias and Z bias of the Y-axis and Z-axis accelerometer may be stored in the non-transitory computer readable memory 134.

In block 332, the microcontroller receives gravity vector from block 336, the X-axis accelerometer signal and the pitch signal from the single-axis fluid-based tilt sensor 320. The microcontroller computes the X bias from the difference between a measured X-axis acceleration value and an expected X-axis acceleration value. The microcontroller determines the expected X-axis acceleration value by computing the projection of the gravity vector onto the X-axis accelerometer axis according to the pitch signal as generated from measurements from the single-axis fluid-based tilt sensor 320. The gravity vector is received from the operation in block 336, where it is derived from measurements from the corrected accelerometers.

In block 333, the X bias value from the operation in block 332 is stored with the Y bias value and Z bias value from the operation in block 331. In block 334, the microcontroller 330 retrieves the X bias, Y bias and Z bias values from the non-transitory computer readable memory and receives the X-axis accelerometer signal, Y-axis accelerometer signal, and Z-axis accelerometer signal to generate a bias-corrected signal for each. The microcontroller 330 computes the difference between each bias value and the respective uncorrected accelerometer signals to produce corrected X-axis accelerometer, Y-axis accelerometer, and Z-axis accelerometer values. The microcontroller may then compute pitch and roll values as a function of the corrected bias acceleration values in block 335. The microcontroller 330 may then output the corrected pitch and roll values. Optionally, the microcontroller 330 may store the corrected pitch and roll values in the non-transitory computer readable memory.

Figure 3C:
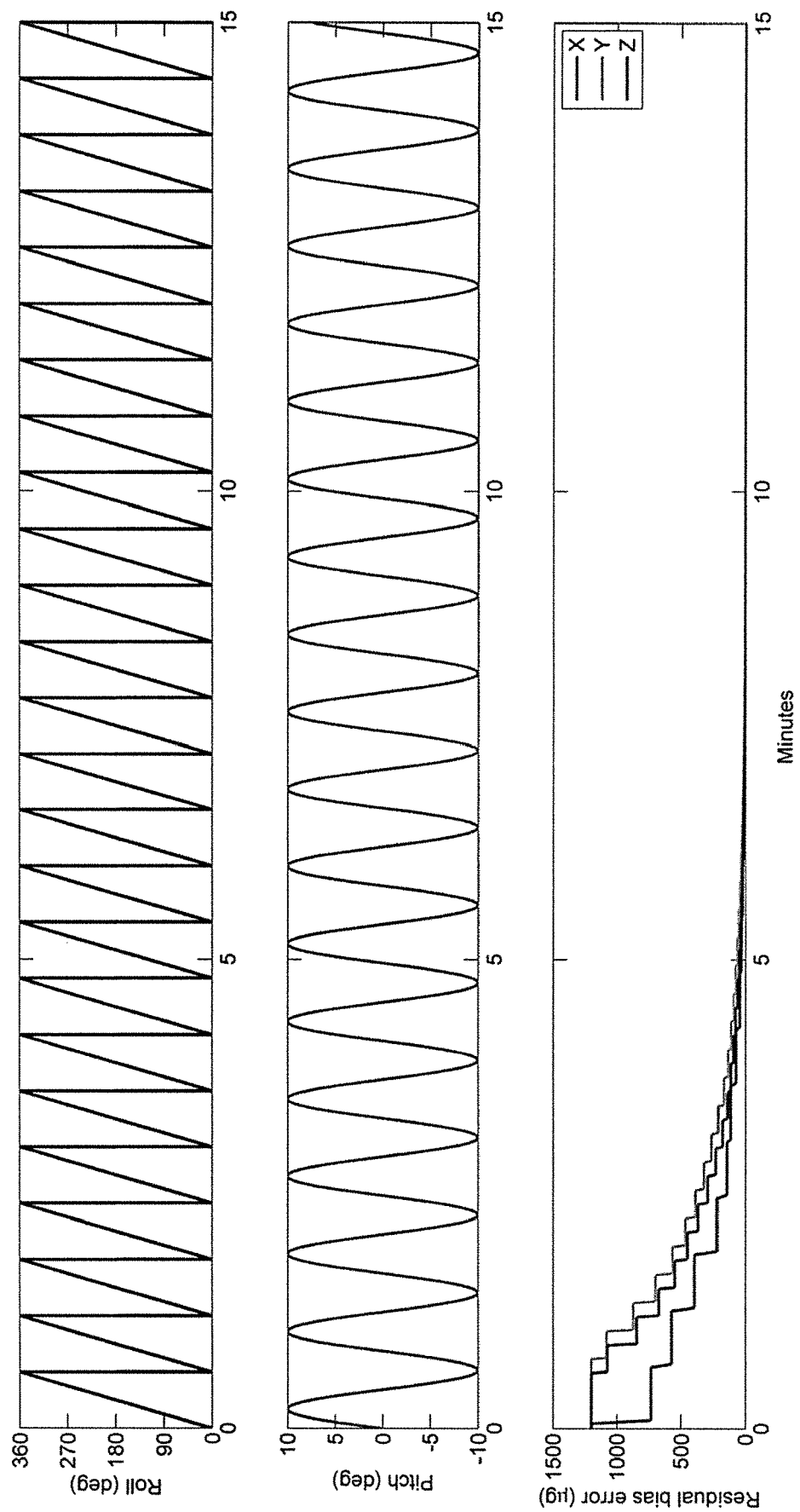
FIG. 3C depicts the results of a simulation of an aspect comprising a driftless system incorporating two multiple-orientation gravimeters and a single-axis fluid-based tilt sensor according to one or more aspects shown and described herein.

Referring now to FIG. 3C, the results of a simulation of an aspect comprising a driftless system incorporating two multiple-orientation gravimeters and a single-axis fluid-based tilt sensor 320 is depicted. The charts depicted in FIG. 3C may represent a simulation of the attitude sensor system defined and described in relation to FIGS. 3A and 3B. As a non-limiting example, FIG. 3C shows the attitude sensor system having a driftless system rolling through multiple 360-degree rotations and pitching from +10 degrees to −10 degrees. FIG. 3C demonstrates how the residual accelerometer bias error converges to zero over time.

Figure 4A:
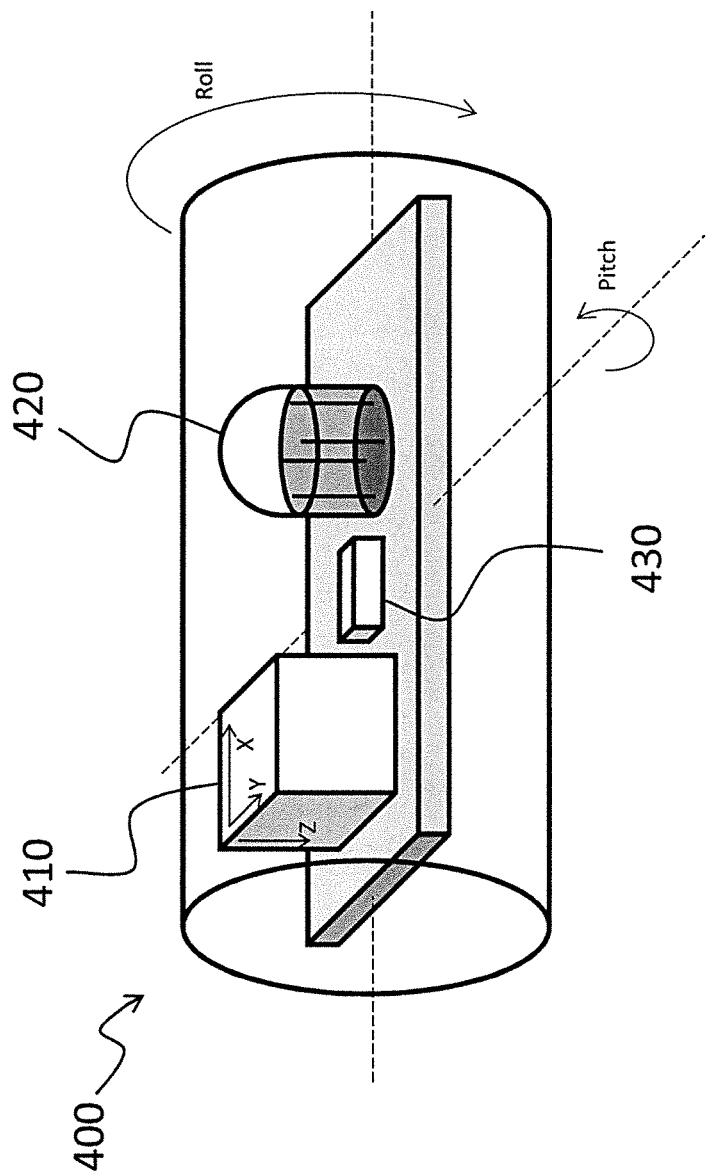
FIG. 4A depicts a schematic of an attitude sensor system having a primary attitude sensor and a driftless system including at least one fluid-based tilt sensor providing tilt information for at least two axes according to one or more aspects shown and described herein.

Referring now to FIG. 4A, the schematic of an attitude sensor system 400 having a primary attitude sensor 410 and a driftless system including at least one fluid-based tilt sensor 420 providing tilt information for at least two axes is depicted. The primary attitude sensor 410 includes an X-axis accelerometer, Y-axis accelerometer, and Z-axis accelerometer. Each of the X-axis accelerometer, Y-axis accelerometer, and Z-axis accelerometer generates a signal indicative of the acceleration along its respective sensitive axis. For example, the X-axis accelerometer generates a signal indicative of the acceleration along the X-axis, its sensitive axis. The at least one fluid-based tilt sensor 420 whose sensitive axes are nominally orthogonal provides a signal for each of the two axes that is indicative of the absolute rotational position about the respective axis. As depicted in FIG. 4A, the at least one fluid-based tilt sensor 420 has two sensitive axes, one nominally aligned with the X-axis and one nominally aligned with the Y-axis. In other aspects, a driftless system comprises at least two single-axis fluid-based tilt sensors whose sensitive axes are nominally orthogonal and provides a signal for each of the two axes that is indicative of the absolute rotational position about the respective axis. The signals generated by the at least one fluid-based tilt sensor 420 include a pitch signal indicative of rotational position about the Y-axis and a roll signal indicative of rotational position about the X-axis. The at least one fluid-based tilt sensor 420 may be communicatively coupled to the microcontroller 430. The aspect depicted in FIG. 4A may be installed in a system with at least partial rotation around both sensitive axes of the fluid-based tilt sensor subsystem (i.e. roll and pitch axes).

Figure 4B:
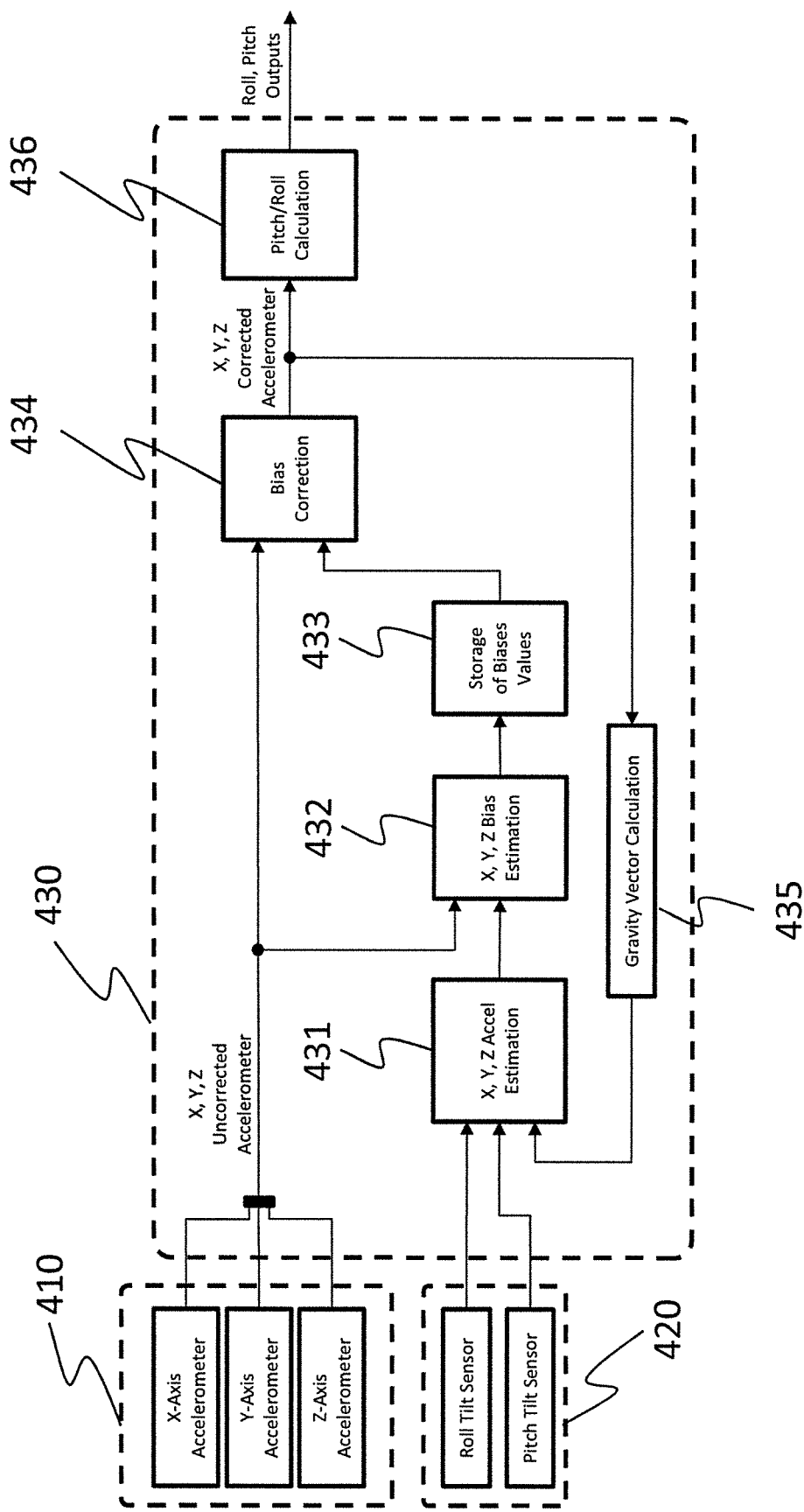
FIG. 4B depicts a block diagram of the operations carried out by the microcontroller of the attitude sensor system illustrated in FIG. 4A according to one or more aspects shown and described herein.

Referring now to FIG. 4B, a block diagram of the operations carried out by the microcontroller 430 of the attitude sensor system 400 illustrated in FIG. 4A is depicted. The microcontroller 430 receives at least an X-axis accelerometer signal, a Y-axis accelerometer signal, a Z-axis accelerometer signal from the primary attitude sensor 410 and a pitch signal and roll signal from the at least one fluid-based tilt sensor 420. The bias of the three accelerometers of the primary attitude sensor 410 may be estimated as the difference between the measured acceleration values and the expected acceleration values of the driftless system. The expected acceleration values may be defined as the projection of the gravity vector onto the accelerometer axes according to attitude sensor roll and pitch as derived from measurements from the at least one fluid-based tilt sensor 420. The gravity vector may be derived from accelerometer measurements after subtracting estimated biases. That is the estimated bias for the accelerometer measurements may be fed back and subtracted from the measured gravity to achieve a corrected gravity vector.

As depicted in FIG. 4B, the microcontroller 430 receives the pitch signal, the roll signal and a gravity vector to estimate the X-axis acceleration, Y-axis acceleration and Z-axis acceleration in block 431. The microcontroller estimates the X-axis acceleration, Y-axis acceleration and Z-axis acceleration by projecting the gravity vector onto each of the respective axis in response to the pitch signal and roll signal. Then in block 432, the microcontroller receives the X-axis acceleration, Y-axis acceleration and Z-axis acceleration estimations and the uncorrected X-axis acceleration, Y-axis acceleration and Z-axis acceleration signals from each of the respective accelerometers of the primary attitude sensor 410. With these signals the microcontroller 430 computes an estimated X bias, Y bias, and Z bias value. The microcontroller 430 may then store the estimated X bias, Y bias, and Z bias values in the non-transitory computer readable memory, in block 433. In block 434, the microcontroller 430 receives the uncorrected X-axis acceleration, Y-axis acceleration and Z-axis acceleration signals and the estimated X bias, Y bias, and Z bias values. The microcontroller 430 computes the difference between the corrected X-axis acceleration, Y-axis acceleration and Z-axis acceleration values by subtracting the estimated X bias, Y bias, and Z bias values from the respective uncorrected X-axis acceleration, Y-axis acceleration and Z-axis acceleration signals. The corrected X-axis acceleration, Y-axis acceleration and Z-axis acceleration values are provided to block 435 to compute the gravity vector. The microcontroller 430 may then compute pitch and roll values as a function of the corrected bias acceleration values in block 436. The microcontroller 430 may then output the corrected pitch and roll values. Optionally, the microcontroller 430 may store the corrected pitch and roll values in the non-transitory computer readable memory.

Figure 4C:
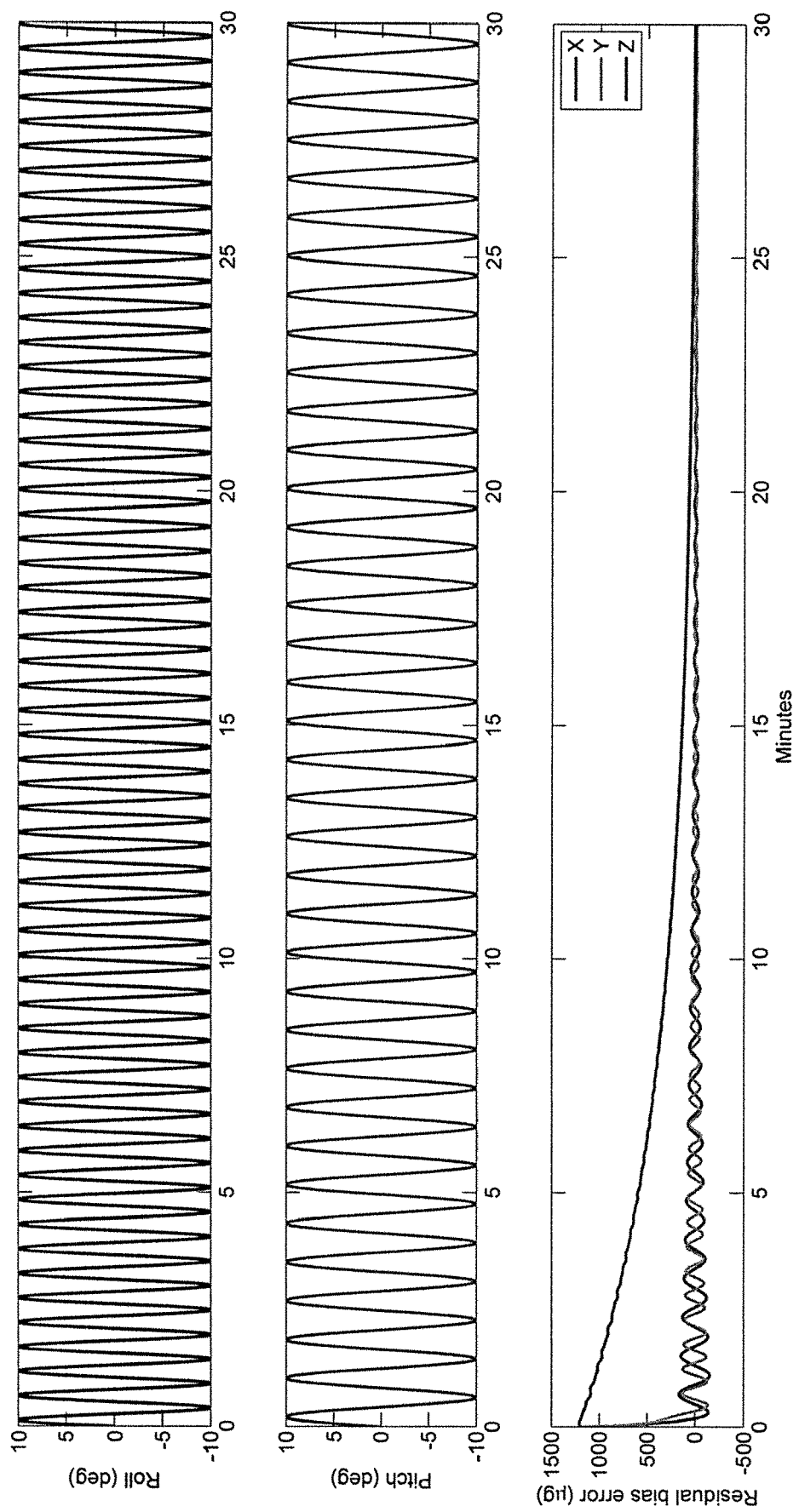
FIG. 4C depicts the results of a simulation of an aspect comprising a driftless system comprising at least one fluid-based tilt sensor providing tilt information for at least two axes according to one or more aspects shown and described herein.

Referring now to FIG. 4C, the results of a simulation of an aspect comprising a driftless system comprising at least one fluid-based tilt sensor 420 providing tilt information for at least two axes is depicted. The charts depicted in FIG. 4C may represent a simulation of the attitude sensor system defined and described in relation to FIGS. 4A and 4B. As a non-limiting example, FIG. 4C shows the attitude sensor system having a driftless system rolling from +10 degrees to −10 degrees and pitching from +10 degrees to −10 degrees. FIG. 4C demonstrates how the residual accelerometer bias errors converge to zero over time.

Figure 4D:
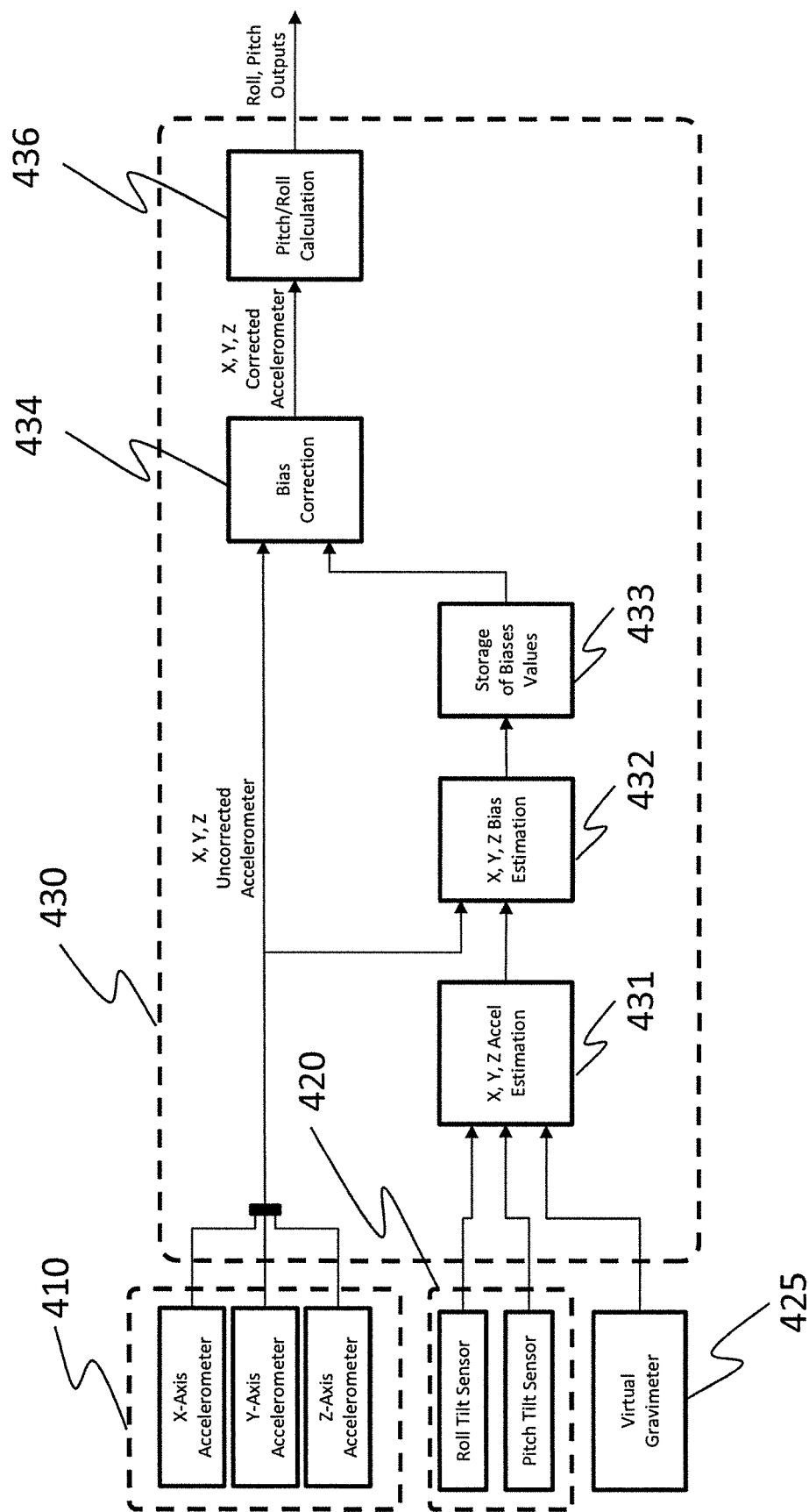
FIG. 4D depicts another block diagram of the operations carried out by the microcontroller of the attitude sensor system illustrated in FIG. 4A according to one or more aspects shown and described herein.

Referring now to FIG. 4D, a block diagram of the operations carried out by the microcontroller 430 of the attitude sensor system 400 illustrated in FIG. 4A is depicted. The microcontroller 430 operates as described in relation to FIG. 4B, however, a virtual gravimeter 425 is communicatively coupled with the microcontroller 430 to provide a gravity vector to block 431 instead of computing a gravity vector from the corrected X-axis acceleration, Y-axis acceleration and Z-axis acceleration values. The microcontroller 430 estimates the X-axis acceleration, Y-axis acceleration and Z-axis acceleration in block 431 by projecting the gravity vector from the virtual gravimeter 425 onto each of the respective axes in response to the pitch signal and roll signal. The gravity vector may be derived from the communicatively coupled virtual gravimeter. That is the gravity vector may be provided by a processor accessing gravity measurements or a gravity map stored on non-transitory computer readable memory. The gravity vector may also be provided by a remotely communicatively coupled processor and non-transitory computer readable memory configured to transmit gravity vector data to the attitude sensor system 400.

Figure 4E:
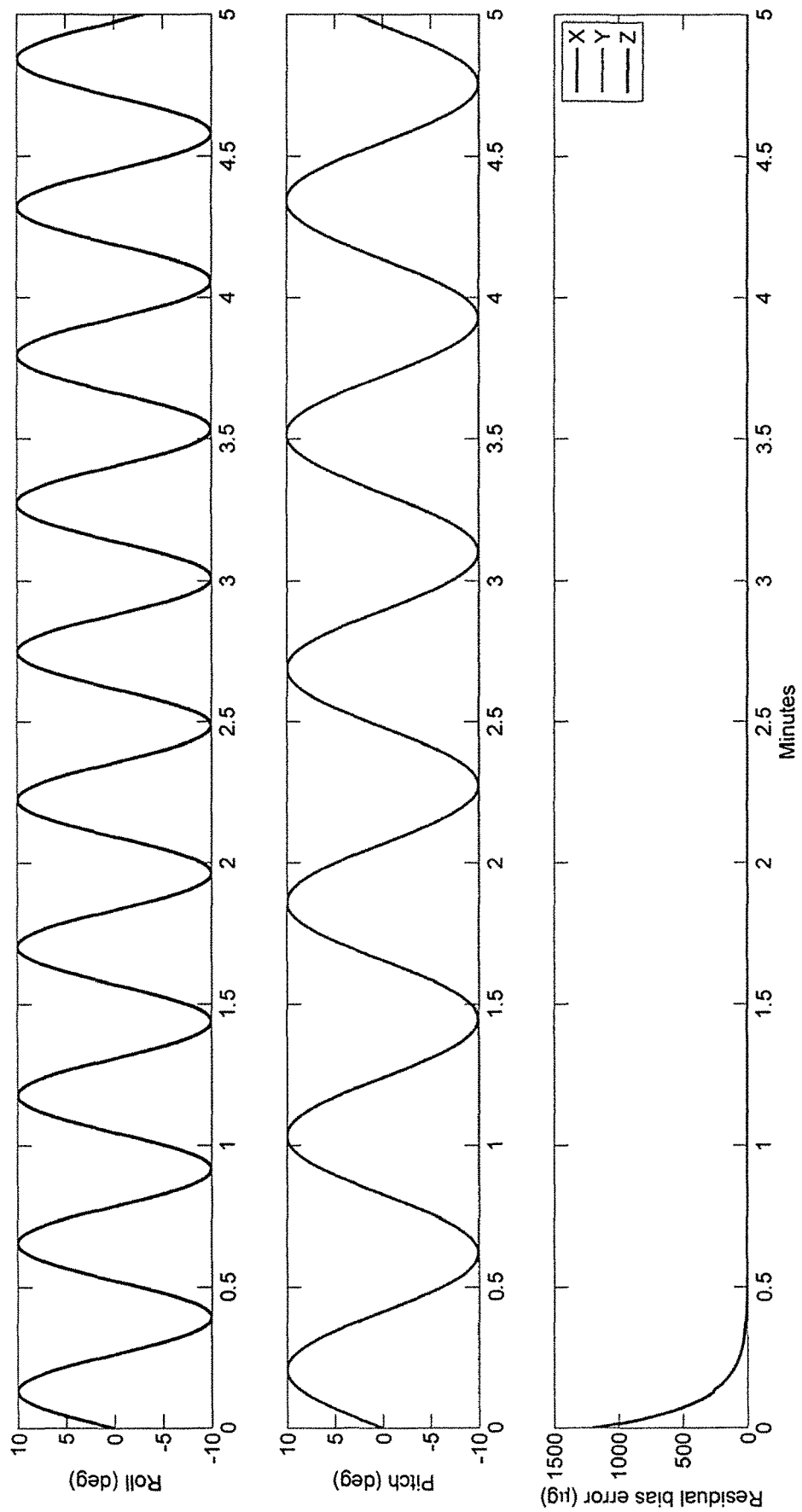
FIG. 4E depicts the results of a simulation of an aspect comprising a driftless system comprising a virtual gravimeter and a fluid-based tilt sensor according to one or more aspects shown and described herein.

Referring now to FIG. 4E, the results of a simulation of an aspect comprising a driftless system comprising a virtual gravimeter 425 and a fluid-based tilt sensor 420 providing tilt information for at least two axes is depicted. The charts depicted in FIG. 4E may represent simulation of the attitude sensor system defined and described in relation to FIGS. 4A and 4D. As a non-limiting example, FIG. 4E shows the attitude sensor system having a driftless system rolling from +10 degrees to −10 degrees and pitching from +10 degrees to −10 degrees. FIG. 4E demonstrates how the residual accelerometer bias errors converge to zero.

Figure 5A:
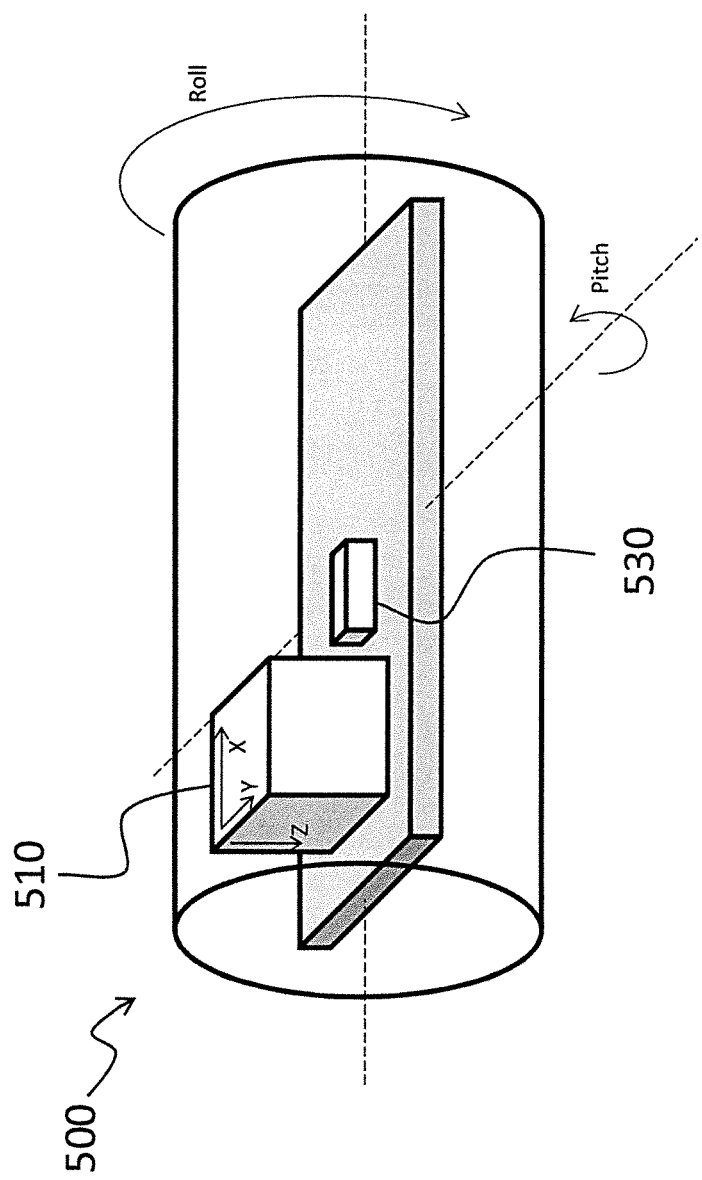
FIG. 5A depicts a schematic of an attitude sensor system having a primary attitude sensor and a driftless system comprising at least two multiple-orientation gravimeters based on at least two accelerometers of the primary attitude sensor according to one or more aspects shown and described herein.

Referring now to FIG. 5A, a schematic of an attitude sensor system 500 having a primary attitude sensor 510 and a driftless system comprising at least two multiple-orientation gravimeters based on at least two accelerometers of the primary attitude sensor is depicted. The primary attitude sensor includes an X-axis accelerometer, Y-axis accelerometer, and Z-axis accelerometer. Each of the X-axis accelerometer, Y-axis accelerometer, and Z-axis accelerometer generates a signal indicative of the acceleration along its respective sensitive axis. For example, the X-axis accelerometer generates a signal indicative of the acceleration along the X-axis, its sensitive axis. The driftless system comprises at least two multiple orientation gravimeters defined by operations of the microcontroller in response to signals from the primary attitude sensor. This aspect may be installed in a system that rotates fully around a substantially non-vertical axis, such that the X axis of the attitude sensor is nominally aligned with the axis of rotation of the system in which the attitude sensor is installed (i.e. roll axis), and rotates at least partially around a second substantially non-vertical axis that is nominally orthogonal to the first axis of rotation (i.e. pitch axis).

Figure 5B:
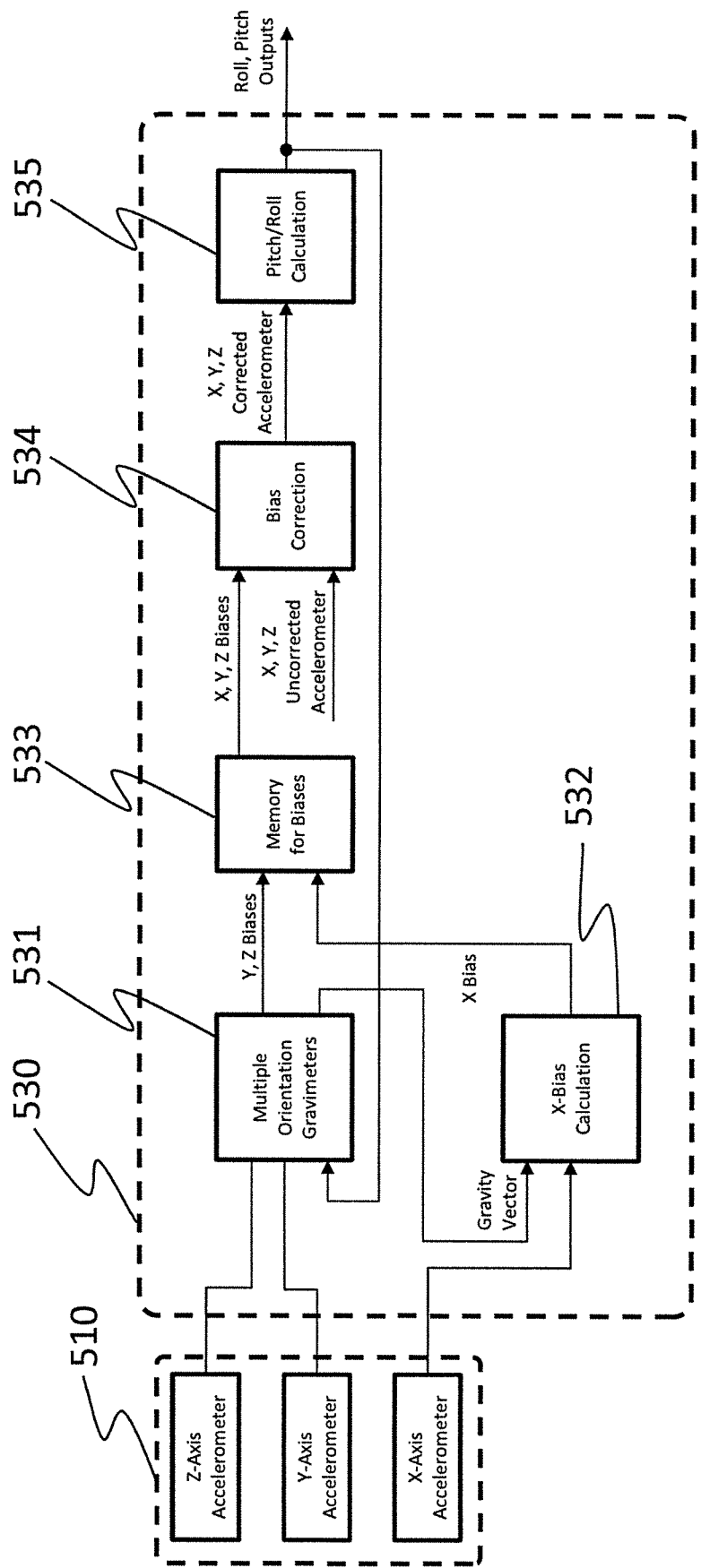
FIG. 5B depicts a block diagram of the operations carried out by the microcontroller of the attitude sensor system illustrated in FIG. 5A according to one or more aspects shown and described herein.

Referring now to FIG. 5B, a block diagram of the operations carried out by the microcontroller 530 of the attitude sensor system 500 illustrated in FIG. 5A is depicted. The bias on the accelerometers having sensitive axes nominally aligned with the Y-axis and Z-axis and the magnitude of the gravity vector may be estimated as in the above description of the multiple-orientation gravimeter. For example, in block 531 the microcontroller 530 receives the Y-axis accelerometer signal and Z-axis accelerometer signal from the primary attitude sensor 510 and initial or corrected calculated pitch and roll values. The pitch and roll values are used to estimate and correct for any off-vertical measurements as discussed above in relation to FIG. 2. The microcontroller 530 may sample portions of the output signals and store the sampled signals as measurements of acceleration along the Y-axis and Z-axis respectively. The microcontroller 530 may then compute the average difference of the measurements of acceleration along the Y-axis and Z-axis, to determine the magnitude of the gravitational vector, respective of each Y-axis and Z-axis accelerometer. The microcontroller 530 may also compute the average sum of the measurements of acceleration along the Y-axis and Z-axis to determine the estimate of the accelerometer bias, respectively Y bias and Z bias. The Y bias and Z bias of the Y-axis and Z-axis accelerometer may be stored in the non-transitory computer readable memory 134. The magnitude of the gravitational vector is input to the X bias calculation.

In block 532, the microcontroller receives gravity vector from block 531 and the X-axis accelerometer signal to compute the X bias. The X bias on the X-axis accelerometer signal may be computed as the difference between the measured X-axis acceleration value and the expected X-axis acceleration value. The expected X-axis acceleration value may be defined as the gravity vector projected onto the X-axis accelerometer according to attitude sensor pitch as derived from measurements from accelerometer measurements after subtracting estimated biases in block 534. The gravity vector is received from the operation in block 531, where it is derived from measurements from the multiple orientation gravimeters.

Figure 5C:
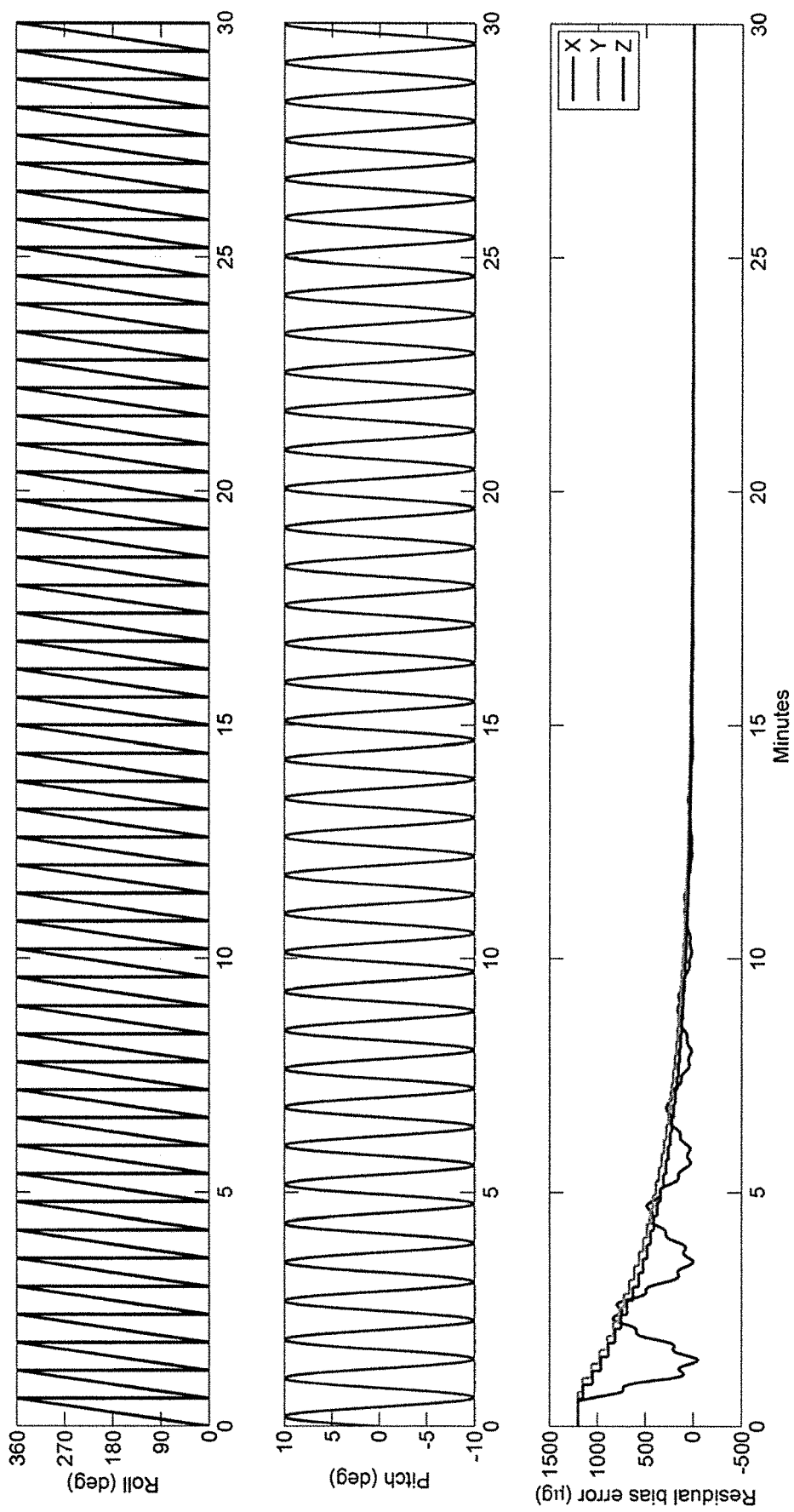
FIG. 5C depicts the results of a simulation of an aspect comprising a driftless system comprising at least two multiple-orientation gravimeters based on at least two primary attitude sensing accelerometers according to one or more aspects shown and described herein.

In block 533, the X bias value from the operation in block 532 is stored with the Y bias value and Z bias value from the operation in block 531. In block 534, the microcontroller retrieves the X bias, Y bias and Z bias values from the non-transitory computer readable memory and receives the X-axis accelerometer signal, Y-axis accelerometer signal, and Z-axis accelerometer signal to generate a bias corrected signal for each. The microcontroller 530 computes the difference between each bias value and the respective uncorrected accelerometer signals to produce corrected X-axis accelerometer, Y-axis accelerometer, and Z-axis accelerometer values. The microcontroller 530 may then compute pitch and roll values as a function of the corrected bias acceleration values in block 535. The microcontroller 530 may then output the corrected pitch and roll values. Optionally, the microcontroller 530 may store the corrected pitch and roll values in the non-transitory computer readable memory Referring now to FIG. 5C, the results of a simulation of an aspect comprising a driftless system comprising at least two multiple-orientation gravimeters based on at least two primary attitude-sensing accelerometers is depicted. The charts depicted in FIG. 5C may represent a simulation of the attitude sensor system defined and described in relation to FIGS. 5A and 5B. FIG. 5C demonstrates how the residual accelerometer bias errors converge to zero over a period of time.

Figure 6A:
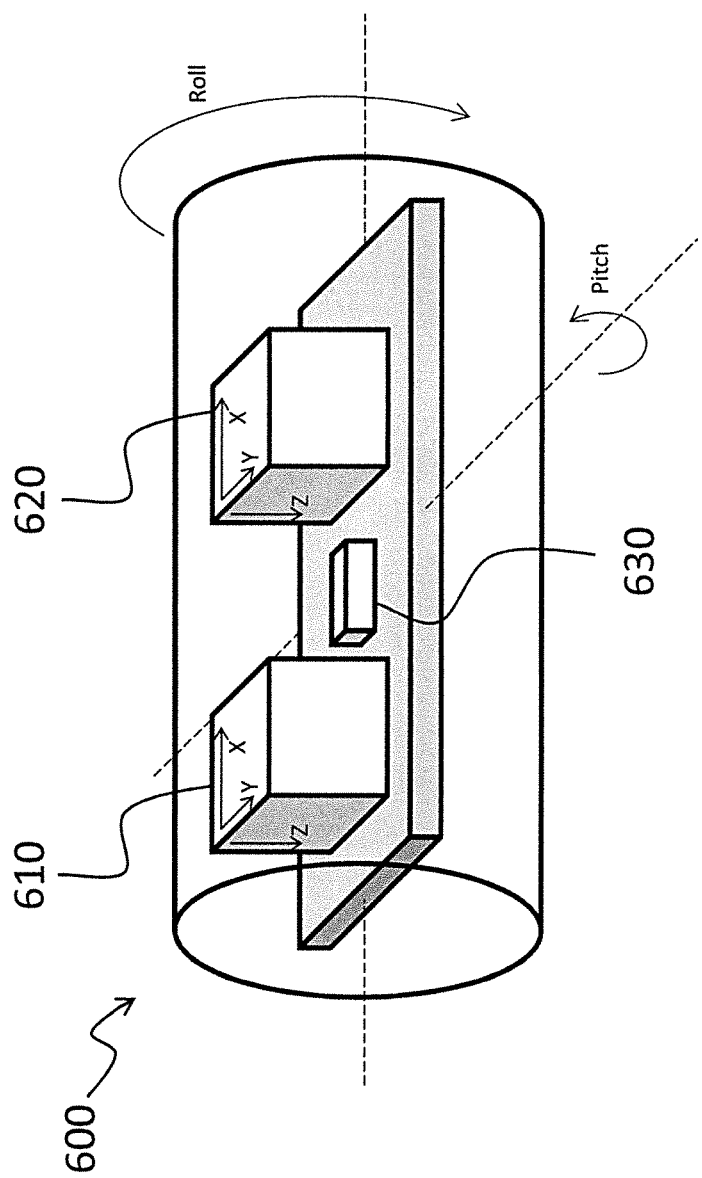
FIG. 6A depicts a schematic of an attitude sensor system having a primary attitude sensor and a driftless system comprising reduced-range accelerometers according to one or more aspects shown and described herein.

Referring now to FIG. 6A, a schematic of an attitude sensor system 600 having a primary attitude sensor 610 and a driftless system comprising reduced-range accelerometers 620 is depicted. The primary attitude sensor 610 includes an X-axis accelerometer, Y-axis accelerometer, and Z-axis accelerometer. Each of the X-axis accelerometer, Y-axis accelerometer, and Z-axis accelerometer generates a signal indicative of the acceleration along its respective sensitive axis. For example, the X-axis accelerometer generates a signal indicative of the acceleration along the X-axis, its sensitive axis. The accelerometers of the primary attitude sensor may have a range of, for example, ±1 g or ±2 g. The driftless system comprises reduced-range accelerometers 620 that may have a range of ±1 g or less, for example ±0.5 g. In aspects where the driftless system comprises reduced-range accelerometers 620, the bias on the three primary attitude-sensing accelerometers may be estimated as the difference between the acceleration values measured by the primary attitude sensing accelerometers and the acceleration values measured by the reduced-range accelerometers 620 of the driftless system. This aspect may be installed in a system that rotates fully around a substantially non-vertical axis, such that one of the accelerometer axes is nominally aligned with the axis of rotation of the system in which the attitude sensor is installed (i.e. roll axis).

Figure 6B:
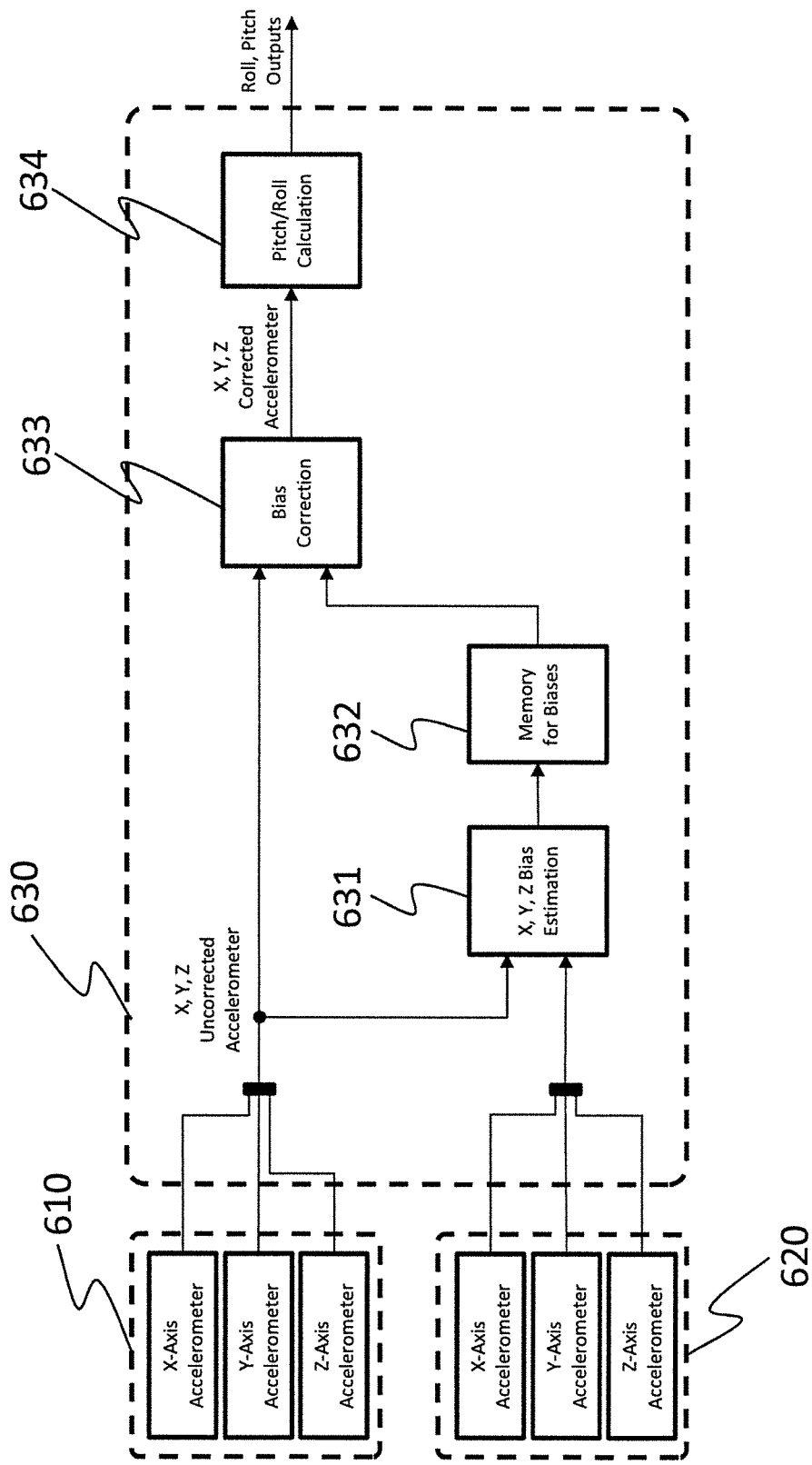
FIG. 6B depicts a block diagram of the operations carried out by the microcontroller of the attitude sensor system illustrated in FIG. 6A according to one or more aspects shown and described herein.

Referring to FIG. 6B, a block diagram of the operations carried out by the microcontroller 630 of the attitude sensor system 600 illustrated in FIG. 6A is depicted. The microcontroller 630 receives X-axis, Y-axis and Z-axis accelerometer signals from the primary attitude sensor 610 along with X-axis, Y-axis and Z-axis reduced-range accelerometer signals from the driftless system. In block 631, the microcontroller 630 samples both the accelerometer signals of the primary attitude sensor 610 and the reduced-range accelerometer signals when the acceleration values are within the operational range of the reduced-range accelerometer 620. For example, if the operational range of a reduced-range accelerometer is ±0.5 g and the current acceleration along that sensitive axis is +0.25 g then the microcontroller 630 will sample the accelerometer signals of both the primary attitude sensor 610 and the driftless system. However, when the current acceleration along that sensitive axis is greater than the operational range of the reduced-range accelerometer then the microcontroller may not sample the accelerometer signals of the primary attitude sensor 610 and the driftless system. Still in block 631, the microcontroller 630 then computes the difference between the sampled accelerometer signals of the primary sensor signal and the reduced-range accelerometer sensor 620 of the driftless system to estimate the bias on each of the X-axis, Y-axis and Z-axis accelerometer signals from the primary attitude sensor 610. In block 632, the microcontroller 630 may then store the X, Y, and Z bias values in the non-transitory computer readable memory. In block 633, the microcontroller 630 retrieves the X bias, Y bias and Z bias values from the non-transitory computer readable memory and receives the X-axis, Y-axis and Z-axis accelerometer signals from the primary attitude sensor 610 to generate a bias corrected signal for each. The microcontroller 630 computes the difference between each bias value and the respective uncorrected accelerometer signals to produce corrected X-axis accelerometer, Y-axis accelerometer, and Z-axis accelerometer values. The microcontroller 630 may then compute pitch and roll values as a function of the corrected bias acceleration values in block 634. The microcontroller 630 may then output the corrected pitch and roll values. Optionally, the microcontroller 530 may store the corrected pitch and roll values in the non-transitory computer readable memory.

Aspects of the attitude sensor system with automatic bias correction may further comprise one or more gyroscopes to stabilize roll and pitch estimates because roll and pitch estimates derived from triaxial accelerometer measurements are susceptible to error stemming from kinematic acceleration of an attitude sensor. The one or more gyroscopes may provide roll and pitch rate information that is reliable over short timescales as compared to the instantaneous roll and pitch estimates provided by accelerometers experiencing both gravitational and kinematic acceleration. The gyroscope is capable of providing a signal indicative of the rate of rotation around a particular axis. In some aspects, stabilizing the roll and pitch estimates derived from triaxial accelerometer measurements may be achieved by integrating the information provided by the signal indicative of the rate of rotation around a particular axis to obtain an alternate estimate of the rotational position about that axis.

Figure 7:
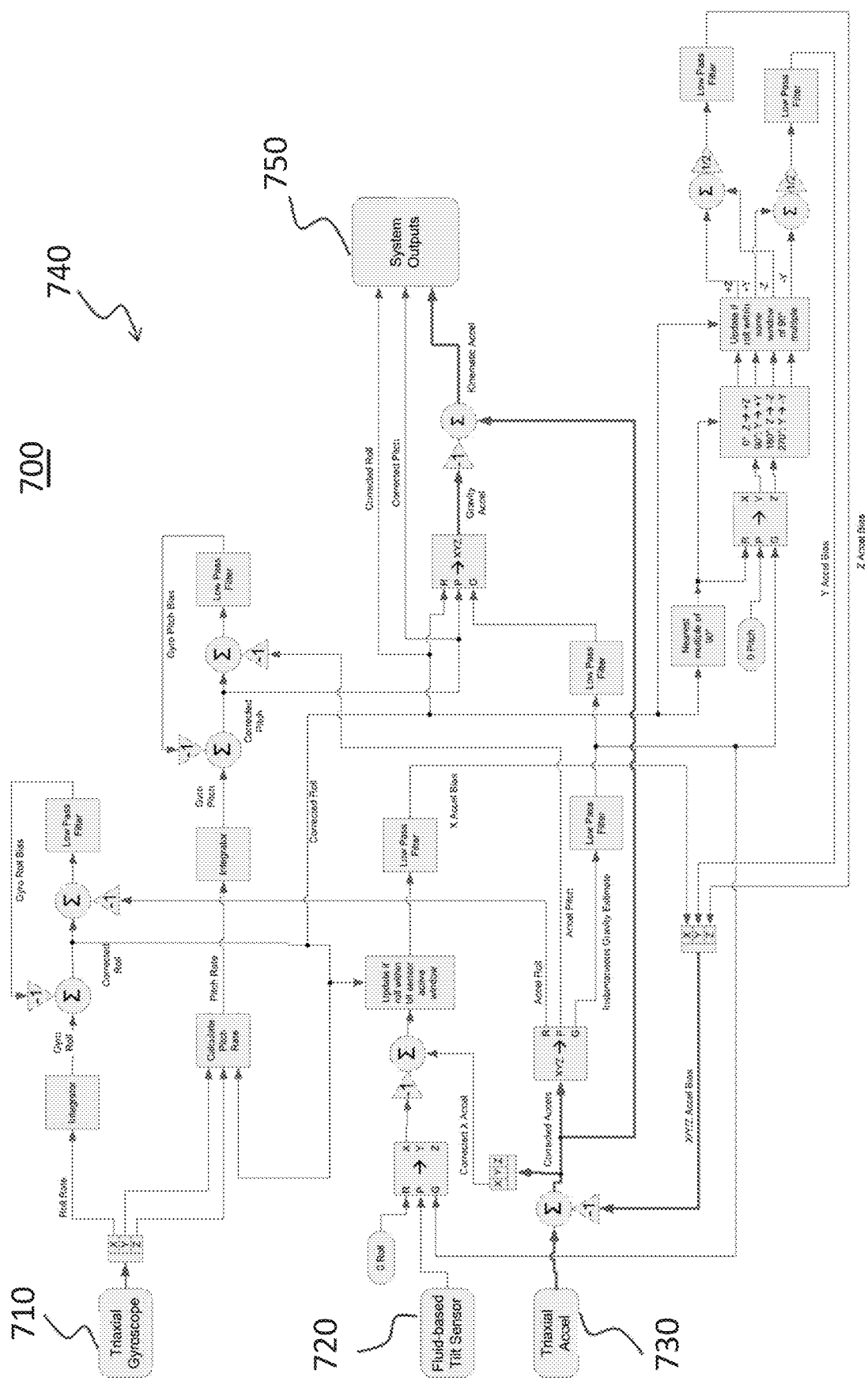
FIG. 7 depicts a block diagram of a possible implementation of a gyroscopically stabilized variant of the attitude sensor system with automatic bias correction according to one or more aspects shown and described herein.

Referring to FIG. 7, a block diagram of a possible implementation of a gyroscopically stabilized variant of the attitude sensor system with automatic bias correction is depicted. Note that the blocks converting R/P/G to X/Y/Z (or vice versa) denote a transformation from Roll, Pitch, and Gravitational magnitude values to X, Y, and Z gravitational acceleration values as measured in the attitude sensor reference frame (or vice versa).

The attitude sensor system 700 with automatic bias correction as depicted in FIG. 7, comprises a triaxial gyroscope 710, a fluid-based tilt sensor 720, a triaxial accelerometer 730 coupled to a logic circuit. The triaxial gyroscope 710 provides three signals to the logic circuit 740. The triaxial gyroscope provides a signal indicative of roll rate, pitch rate and yaw rate for each of the three orthogonal axes, respectively and herein referred to as X-axis roll rate, Y-axis roll rate and Z-axis roll rate. The fluid-based tilt sensor 720 is nominally aligned with the X-axis to provide a signal indicative of pitch along the X-axis. The triaxial accelerometer 730 provides a signal indicative of acceleration in each of the three orthogonal axes relative to the triaxial accelerometer 730, herein referred to as X-acceleration, Y-acceleration, and Z-acceleration.

The X-axis roll rate from the triaxial gyroscope 710 is integrated to generate a gyro roll value for a defined amount of time and summed with the negative of the gyro roll bias to generate a corrected roll value. The gyro roll bias is determined from a low pass filtered sum of the negative of the roll acceleration and the gyro roll value. A pitch rate is calculated from the Y-axis roll rate, Z-axis roll rate and the corrected roll value. The pitch rate is then integrated to generate a gyro pitch value for a defined amount of time and summed with the negative of the gyro pitch bias to generate a corrected pitch value. The gyro pitch bias is determined from a low pass filtered sum of the negative of the pitch acceleration and the gyro pitch value.

The corrected roll value is further provided to update the X-acceleration bias when the tilt sensor is within an active window. The tilt sensor is within an active window when the fluid-based tilt sensor is capable of providing a signal indicative of tilt within its designed measurement range. For example, a tilt sensor may have a measurement range of +1-10 degrees; therefore, its active window is when a signal indicative of an angle between +1-10 degrees is generated. The measured pitch angle from the tilt sensor and the instantaneous gravity estimate from the triaxial accelerometer are used to calculate the projection of the gravity vector on the X-axis. This value is inverted and added to the previously calculated X-acceleration value to generate an updated X-acceleration bias estimate. The X-acceleration bias is then inverted and added to the X-acceleration value to generate a corrected X-acceleration value.

The corrected roll value is further provided to generate Y-acceleration bias and Z-acceleration bias. The corrected roll value is converted to the nearest multiple of 90 degrees and combined with a zero pitch value and an instantaneous gravity estimate from the triaxial accelerometer. Logical operators, for example using software routines stored in non-transitory computer readable memory and executed by a processor of a microcontroller, determine whether the Y and Z components should be negative or positive values based on the nearest multiple of 90 degrees of the corrected roll value. Then, the average sum of each the Y and Z components is independently calculated and passed through a low pass filter to generate the Y-acceleration bias value and Z-acceleration bias value. The X-acceleration bias value, the Y-acceleration bias value, and the Z-acceleration bias value are inverted and added to the X-acceleration, Y-acceleration, and Z-acceleration values of the triaxial accelerometer 730 to generated bias corrected acceleration values.

The bias corrected acceleration values are summed with the gravity acceleration value determined from the corrected roll value, the corrected pitch value and filtered instantaneous gravity estimate to generate the kinematic acceleration signal. The kinematic acceleration signal, the corrected roll and the corrected pitch are provided as outputs at the system output 750 as shown in FIG. 7. It should be understood that the term value may refer to the signal indicative to the described value.

Aspects of the attitude sensor system with automatic bias correction may require signal conditioning and signal processing for practical implementation that is not explicitly described above but is known to a person of ordinary skill in the art. Examples include but are not limited to: orthogonalization of intentionally or incidentally non-orthogonal multiple-axis component sensor subsystems; correction for non-alignment between intentionally or incidentally non-aligned component sensors; scale, offset and nonlinearity correction of component sensor signals; temperature compensation of scale, offset and nonlinearity correction terms for component sensor signals; temperature compensation of orthogonalization correction terms; temperature compensation of alignment correction terms; and anti-noise and anti-alias filtering of component sensor signals and downstream signals.

In accordance with various aspects, e.g., as described above, the orientation of the attitude sensor should align with the operational range of the incorporated driftless systems frequently enough to estimate and correct for the bias of the primary attitude sensing accelerometers before they drift beyond acceptable levels for attitude sensor requirements. That is, in some aspects, the orientation of the primary sensors should align with the operational range of the driftless system periodically, with a maximum, predetermined amount of time between alignments, wherein the amount of time is defined as sufficient to estimate and correct for bias prior to the bias exceeding accuracy requirements, depending on the system and configuration. For example, the operational range of the driftless system may be: +/−0.1 g, +/−1 g, +/−1°, +/−5°, or +/−10° For example, a predefined amount of time may be about 1 day, about 1 week, about 1 month, or about 1 year. This usually requires full and/or partial rotation of the attitude sensor around one or more axes of rotation. Full rotation may be accomplished using an actuator intended for that purpose, or it may be accomplished through the normal motion of the system in which the attitude sensor is installed.

Examples of rotation through normal operation may include, but are not limited to the rotation of a towed body, such as an acoustic array, in the water; the rotation of a wheel on a ground vehicle; the rotation of a spool reeling in or unreeling a cable; the rotation of a manned or unmanned underwater vehicle through the water; the rotation of a manned or unmanned aircraft through the air; the rotation of a projectile in flight; the rotation of a drivetrain element such as a pulley or gear; and/or the incidental or intentional rotation of a handheld device. Partial rotation may additionally be accomplished through the motion of a floating body in response to waves; the motion of a flexible body in response to air and/or water currents; the actuation of a pointing, targeting, or aiming platform; the motion of a ground vehicle moving over terrain; and/or the incidental or intentional rotation of a device worn on or implanted in a body, such as a hand, wrist, foot or ankle. In various aspects and/or configurations of the aspects described above, or variations thereon, may include logic to determine when the attitude sensor is in an orientation window such that measurements from an associated driftless system can be used for accelerometer bias estimation.

The disclosed concepts and aspects may be embodied in many different forms, and this disclosure should not be construed as limited to the aspects set forth herein. Rather, the described aspects are provided so that this disclosure will be thorough and complete. Like reference numerals refer to like elements throughout While the invention has been described with reference to an exemplary aspect(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof

What is claimed is:

1. An attitude sensor system with automatic bias correction comprising:
    a primary attitude sensor wherein the primary attitude sensor comprises at least one accelerometer configured to measure a magnitude and a direction of a gravity vector; and
    an auxiliary sensor system comprising at least one sensor selected from the group consisting of: a tilt sensor; a virtual gravimeter; or a reduced-range MEMS accelerometer;
    wherein the attitude sensor system determines a difference between an acceleration value of the primary attitude sensor and an acceleration value of the auxiliary sensor system on an ongoing basis to automatically estimate a bias of the gravity vector of the at least one accelerometer of the primary attitude sensor such that an error resulting from the bias is removed from an output of the attitude sensor system.

2. The attitude sensor system of claim 1, wherein the primary attitude sensor comprises accelerometers with at least three nominally orthogonal sensitive axes.

3. The attitude sensor system of claim 1, wherein an orientation of the primary attitude sensor periodically aligns with an operational range of the auxiliary sensor system, with a maximum, predetermined amount of time between alignments.

4. The attitude sensor system of claim 1, wherein an operational range of orientations of the auxiliary sensor system is limited relative to the range of orientations required by the attitude sensor system.

5. The attitude sensor system of claim 1, wherein the auxiliary sensor system comprises a tilt sensor wherein a sensitive axis of the tilt sensor is nominally orthogonal to a sensitive axis of a first accelerometer of the primary attitude sensor.

6. The attitude sensor system of claim 5, further comprising a second accelerometer of the primary attitude sensor and a third accelerometer of the primary attitude sensor, wherein the first accelerometer of the primary attitude sensor, the second accelerometer of the primary attitude sensor and the third accelerometer of the primary attitude sensor are arranged in a nominally orthogonal configuration.

7. The attitude sensor system of claim 1, wherein the auxiliary sensor system comprises a virtual gravimeter and a two-axis tilt sensor, wherein a first sensitive axis of the two-axis tilt sensor and a second sensitive axis of the two-axis tilt sensor are arranged in a nominally horizontal and orthogonal configuration.

8. The attitude sensor system of claim 1, wherein the auxiliary sensor system comprises a virtual gravimeter, a first tilt sensor and a second tilt sensor, wherein a first sensitive axis of the first tilt sensor and a first sensitive axis of the second tilt sensor are arranged in a nominally horizontal and orthogonal configuration.

9. The attitude sensor system of claim 1, wherein the auxiliary sensor system comprises a reduced-range MEMS accelerometer comprising a range of ±1 g or less.

10. The attitude sensor system of claim 1, wherein the auxiliary sensor system comprises at least three reduced-range MEMS accelerometers wherein each of the at least three reduced-range MEMS accelerometers are nominally aligned with each of an at least three orthogonally aligned primary attitude sensors.

11. A method for automatic bias correction in an attitude sensor system, the method comprising:
    obtaining an acceleration value from a sensitive axis of an accelerometer of a primary attitude sensor configured to measure a magnitude and a direction of a gravity vector;
    obtaining an acceleration value of an auxiliary sensor system comprising at least one sensor selected from the group consisting of: a tilt sensor; a virtual gravimeter; or a reduced-range MEMS accelerometer;
    determining a difference between the acceleration value of the primary attitude sensor and the acceleration value of the auxiliary sensor system to automatically estimate a bias of the gravity vector on an ongoing basis;
    subtracting the bias from the acceleration value of the primary attitude sensor to generate a bias-corrected primary attitude sensor signal; and
    outputting the bias-corrected primary attitude sensor signal.

12. The method of claim 11, wherein the acceleration value of the auxiliary sensor system comprises a value from a reduced-range accelerometer.

13. The method of claim 11, wherein the acceleration value of the auxiliary sensor system is a projection of a gravity vector onto the sensitive axis of the accelerometer of the primary attitude sensor.

14. The method of claim 13, wherein the projection of the gravity vector is derived from a tilt sensor and a virtual gravimeter.

15. An attitude sensor system with automatic bias correction comprising:
    a primary attitude sensor wherein the primary attitude sensor comprises at least one accelerometer configured to measure a magnitude and a direction of a gravity vector; and an auxiliary sensor system comprising at least one sensor selected from the group consisting of: a tilt sensor; a virtual gravimeter; or a reduced-range MEMS accelerometer; and wherein the attitude sensor system determines a difference between an acceleration value of the primary attitude sensor and an acceleration value of the auxiliary sensor system on an ongoing basis to automatically estimate a bias of the gravity vector of the at least one accelerometer of the primary attitude sensor based on a stable response from the auxiliary sensor system such that an error resulting from the bias is removed from an output of the attitude sensor system.

* * * * *